P. ANDRÉ.
SHEARING AND MOWING MACHINE.
APPLICATION FILED JAN. 22, 1919.

1,351,939.

Patented Sept. 7, 1920.
11 SHEETS—SHEET 1.

Fig. 1.

INVENTOR
Paul André
BY
ATTORNEY

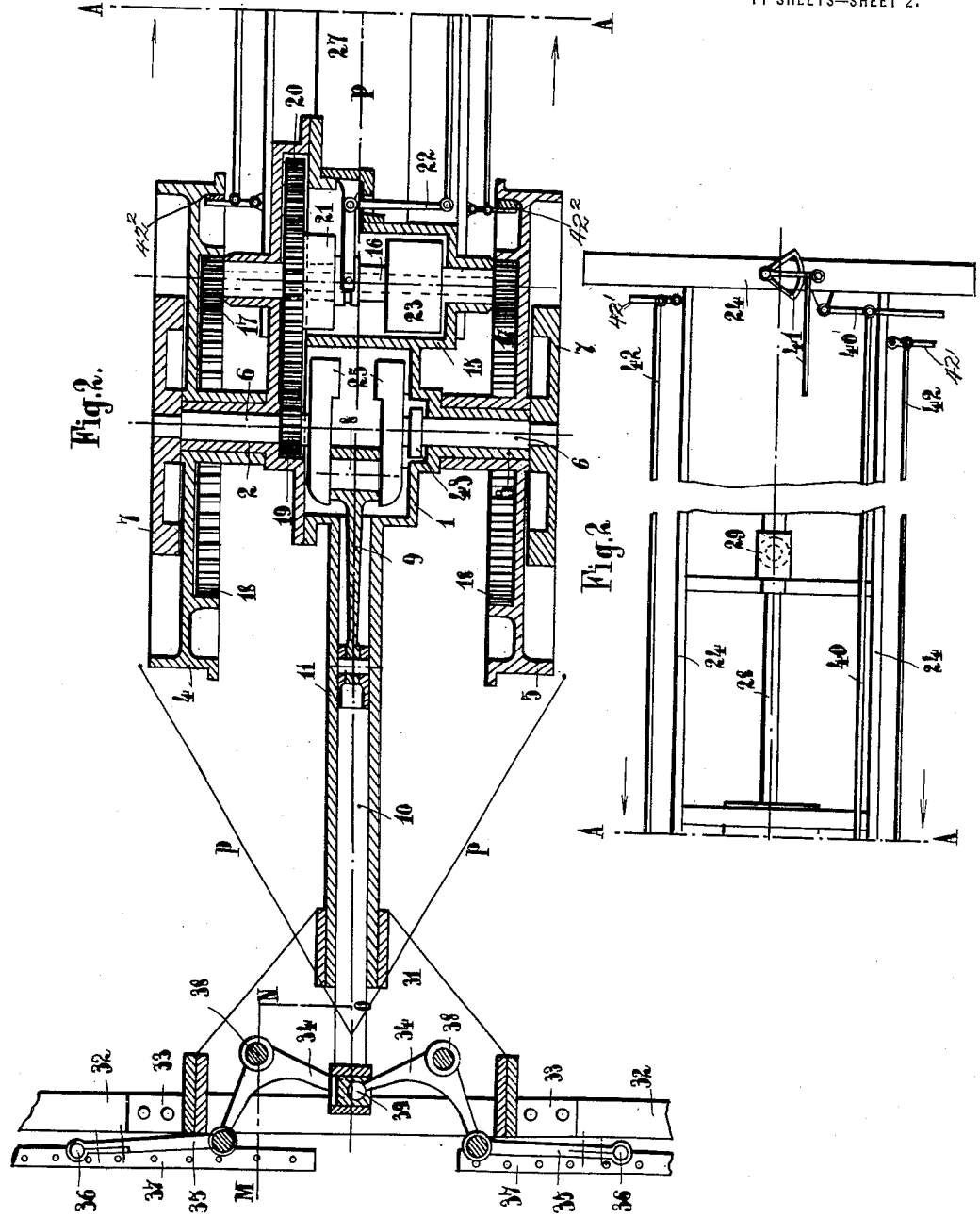

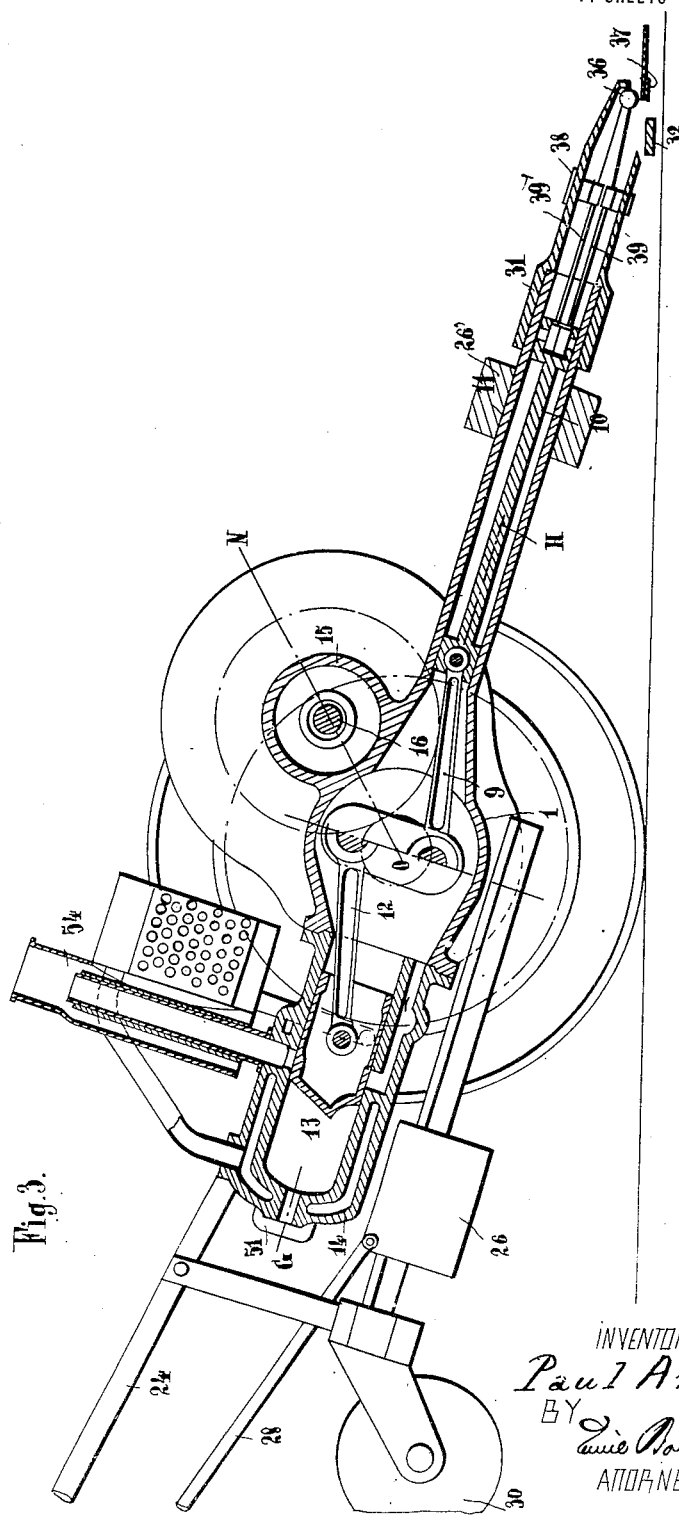

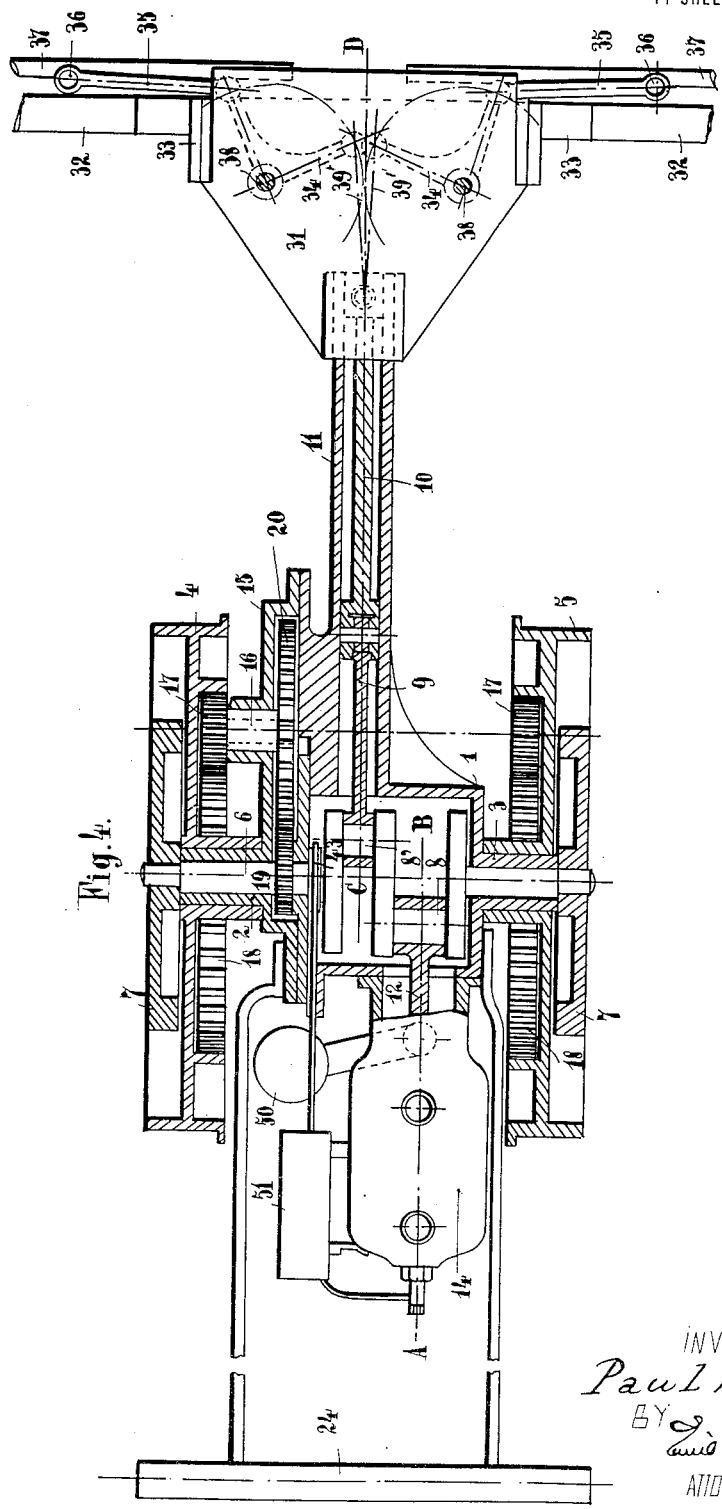

P. ANDRÉ.
SHEARING AND MOWING MACHINE.
APPLICATION FILED JAN. 22, 1919.
1,351,939.
Patented Sept. 7, 1920.
11 SHEETS—SHEET 5.
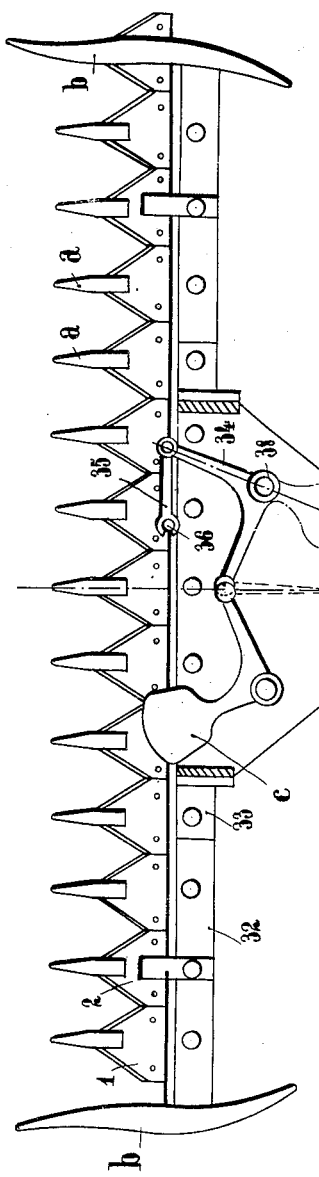
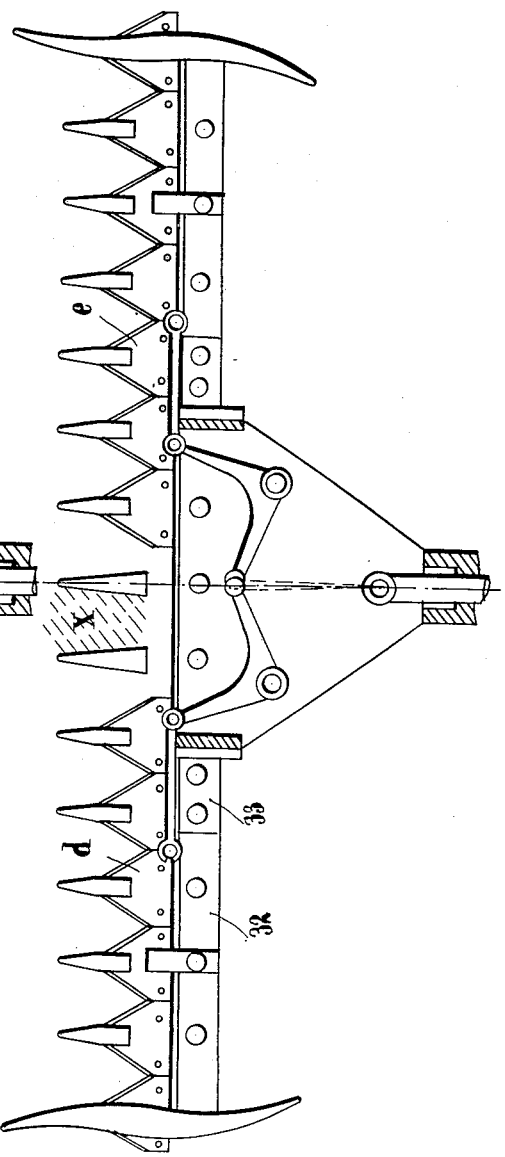
INVENTOR
Paul André
BY
ATTORNEY

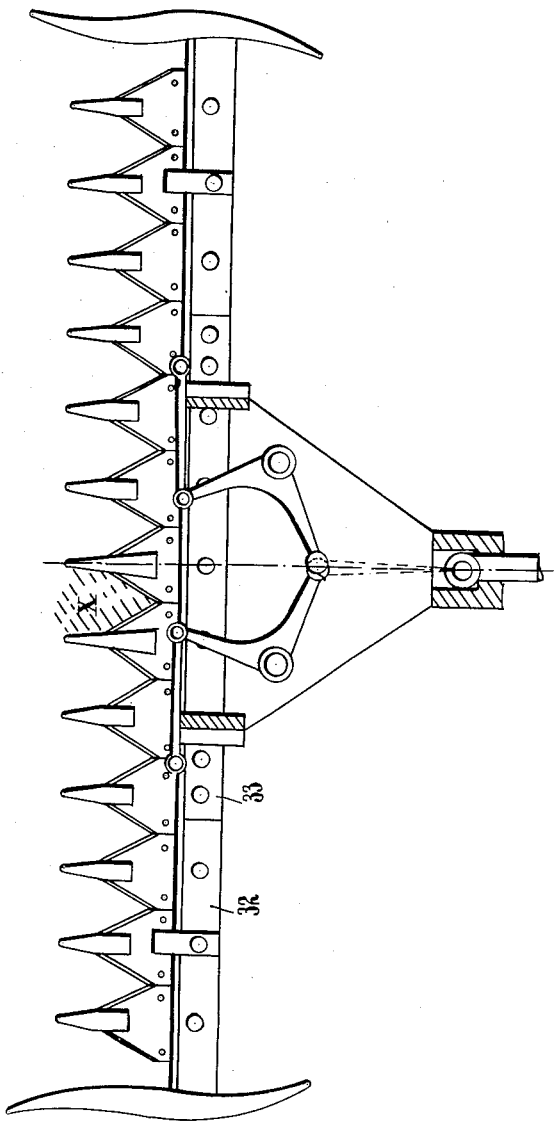

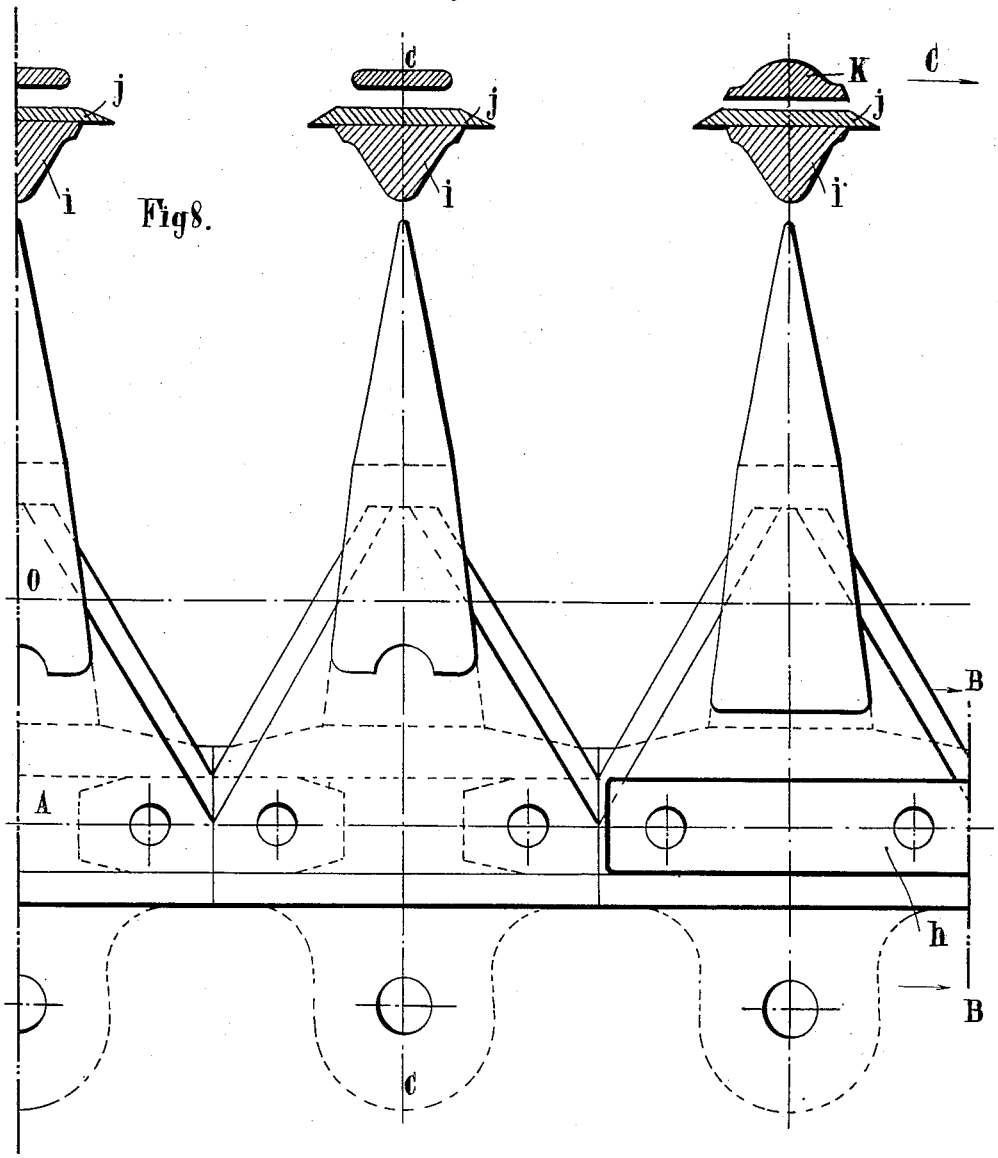

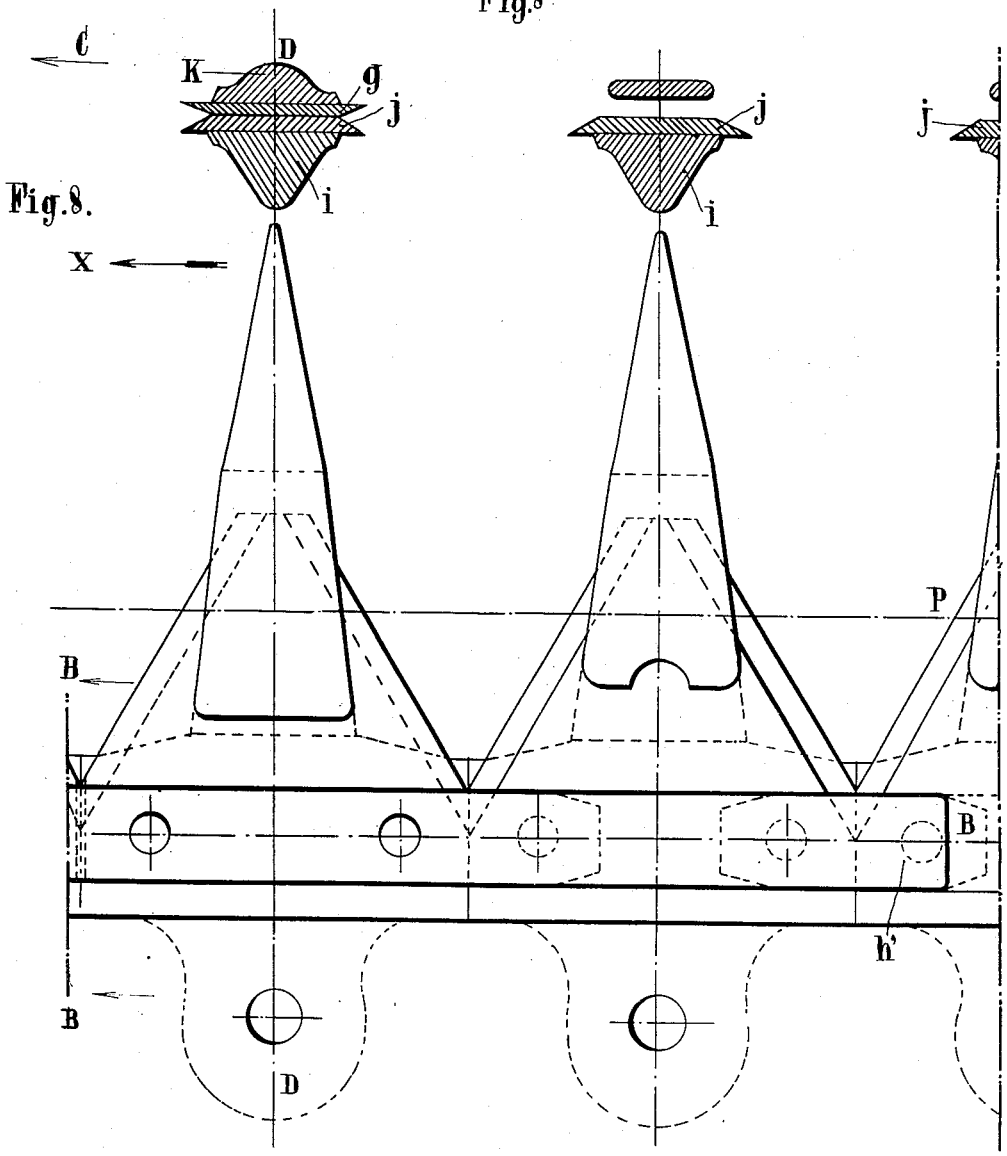

P. ANDRÉ.
SHEARING AND MOWING MACHINE.
APPLICATION FILED JAN. 22, 1919.
1,351,939.
Patented Sept. 7, 1920.
11 SHEETS—SHEET 9.
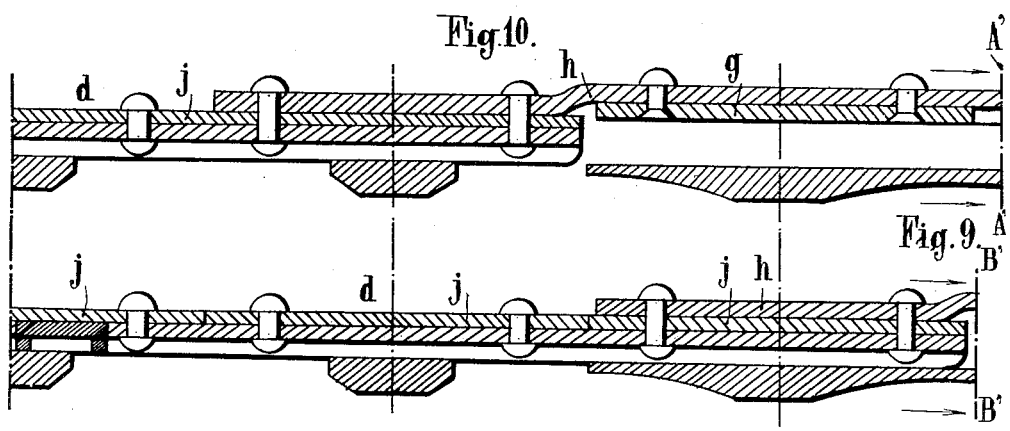
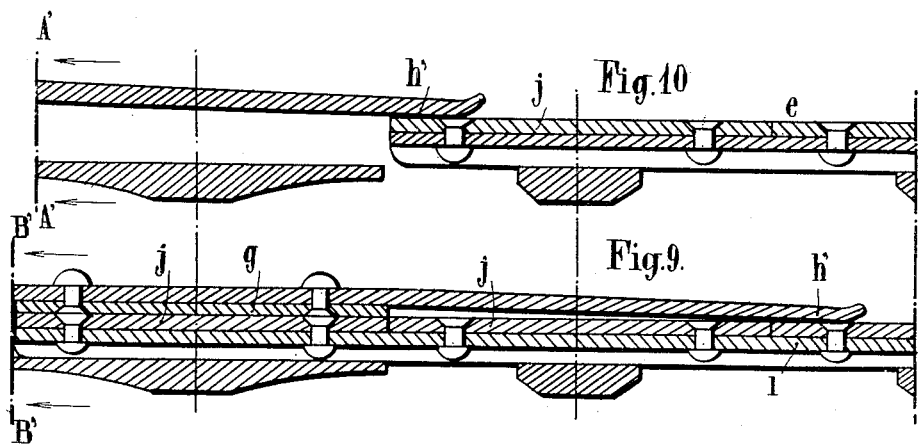
INVENTOR
Paul André
BY
ATTORNEY

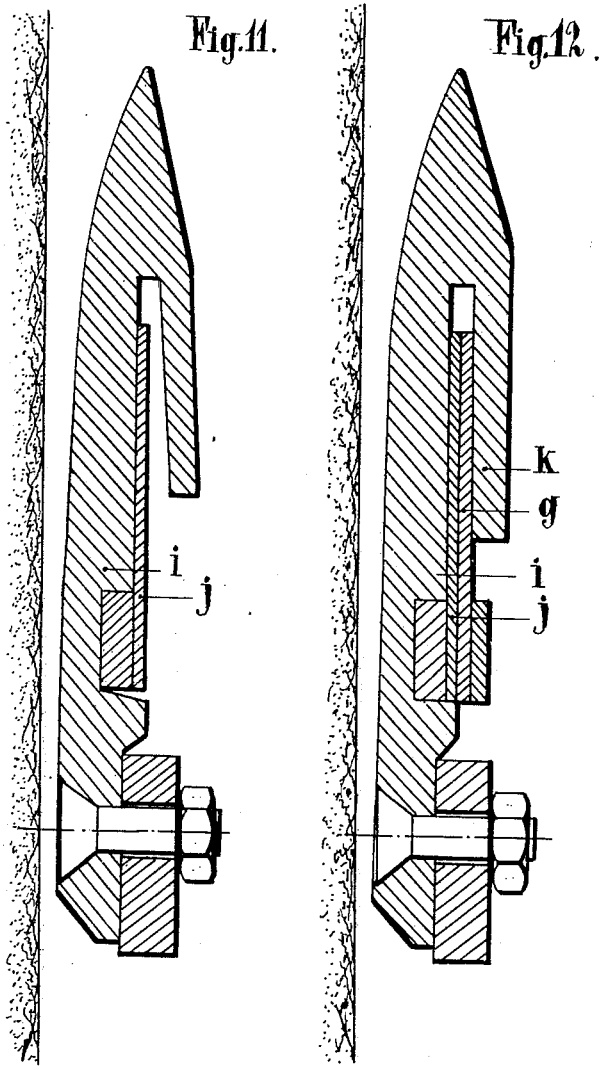

P. ANDRE.
SHEARING AND MOWING MACHINE.
APPLICATION FILED JAN. 22, 1919.
1,351,939.
Patented Sept. 7, 1920.
11 SHEETS—SHEET 11.
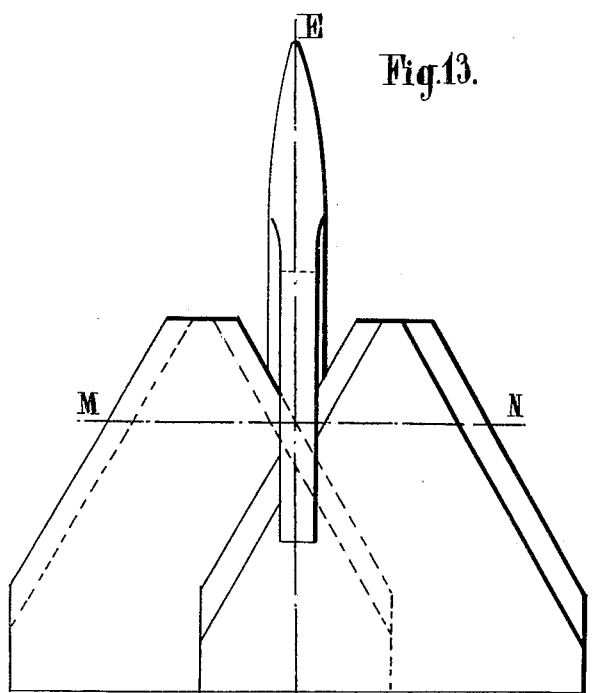
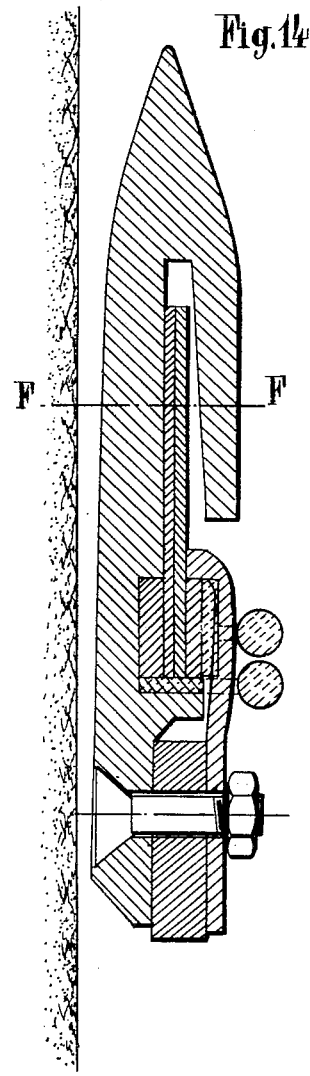
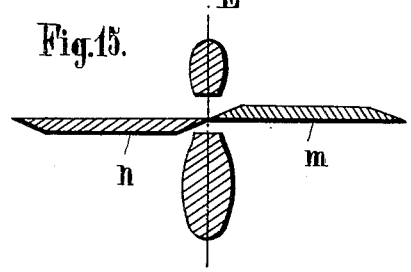
INVENTOR
Paul André
BY
ATTORNEY

UNITED STATES PATENT OFFICE.

PAUL ANDRÉ, OF LE VAL D'AJOL, FRANCE.

SHEARING AND MOWING MACHINE.

1,351,939.  Specification of Letters Patent.  Patented Sept. 7, 1920.

Application filed January 22, 1919. Serial No. 272,516.

*To all whom it may concern:*

Be it known that I, PAUL ANDRÉ, citizen of the Republic of France, and resident of Le val d'Ajol, Vosges, France, have invented a new and useful Shearing and Mowing Machine, which improvements are fully set forth in the following specification.

The present invention relates to moving machines; and it resides, briefly, in the provision of an improved machine of the character indicated in which an internal combustion engine is utilized to operate both the cutting mechanism and the two driving wheels, the latter serving by themselves to support the entire structure. The machine is balanced on a single shaft or axle, and the cutting mechanism is caused to press against the ground by moving forward an adjustable weight in the direction of the longitudinal axis of the machine, while steering is effected by means of an auxiliary frame extending rearwardly of the machine and terminating in a cross-piece or handle which is grasped by the operator walking behind the machine, and on or adjacent to which are located the various devices for controlling the action of the driving wheels, the speed of the engine and the position of the afore-mentioned weight.

An embodiment of the invention is illustrated by way of example in the accompanying drawings, in which:—

Figures 1 and 2 are, respectively, a vertical section and a part-sectional plan view of the complete machine;

Fig. 3 is a side elevation of a slightly modified construction, with parts in vertical section;

Fig. 4 is a part-sectional plan view of Fig. 3;

Figs. 5, 6 and 7 are enlarged plan views of the cutting mechanism, showing certain modifications in the construction and arrangement of some of its component parts;

Fig. 8 is a fragmental plan view, on a still greater scale, of the cutting mechanism, representing a further modification;

Figs. 8ᵃ and 9 are sections taken, respectively, on lines O—P and A—B of Fig. 8;

Fig. 10 is a view similar to Fig. 9 but showing the parts in a different position;

Figs. 11 and 12 are sections taken, respectively, on lines C—C and D—D of Fig. 8;

Fig. 13 is a fragmental plan view of a still further modification;

Fig. 14 is a section on line E—E, Fig. 13; and

Fig. 15 is a section on line M—N, Fig. 13.

Referring to Figs. 1 and 2, the machine is illustrated as embodying a single cylinder engine of any desired type, the gear case 1 of which comprises two cylindrical or sleeve-like parts 2 and 3 which form journals for the driving wheels 4 and 5 and in which the crank shaft 6 rotates. The latter carries at its ends the fly-wheels 7, and its crank portion 8 is connected by a rod 9 to the rear end of a bar 10 which is mounted to reciprocate in a tubular case 11 subsequently referred to. The single engine cylinder mentioned above is indicated at 14, and its piston is connected to operate the crank shaft by means of a rod 12, the side portions of the crank being extended and enlarged, as indicated at 25, to form supplemental fly-wheels.

The driving wheels 4 and 5 are loosely mounted on the crank shaft, and are driven therefrom through the intermediary of internal annular gears 18 with which they are provided, these gears meshing with pinions 17 mounted on the ends of a cross-shaft 16 which is itself journaled in an auxiliary gear case 15 cast integral with or otherwise rigidly secured to the gear case 1. The crank shaft 6 has keyed to it a pinion 19 which meshes with and drives a gear 20 loosely mounted on the cross-shaft 16 but adapted to be coupled thereto by means of a sliding clutch member 21, the latter being operated by a fork 22, which, in turn, is connected to the front end of a rod 40, the rear end of which is attached to a hand lever 40'. Shaft 16 is preferably constructed in two parts or sections connected by a differential 23 to facilitate turning of the machine.

Steering is effected by means of a rearwardly-extending frame 24, the side rails of which are suitably attached at their front ends to the auxiliary gear case 15 and are connected together at their rear ends by a cross-piece or handle to which the clutch-controlling lever 40' is fastened. A cylinder 27 is secured partly to the said side rails and partly to the gear case 15 in any approved manner, and constitutes a guide wherein a suitable balance weight 26 is adjustably fitted, said weight having pivoted to it one end of a rod 28 whose other end terminates in a block which is slidably connected with frame 24. This block is adapted to be locked in adjusted position by means of a catch 29, and when moved outwardly of its guide cylinder 27 to its extreme rear position, it will cause the rear portion of the machine to swing or tilt downward, thereby bringing into contact with the ground a wheel 30 which is attached to the under side of the cylinder. Instead of locating the balance weight in rear of the crank shaft, it may be disposed in front thereof and mounted to straddle the tubular case 11 and to slide thereon, as indicated at 26'.

The steering frame has also attached to its cross-piece or handle a device 41 which is connected to control the throttle valve (not shown) of the engine; and adjacent the rear ends of its side rails it carries a pair of controlling levers 42', each connected to one end of a rod 42, the other end of which carries a brake shoe 42² for coaction with the corresponding driving wheel 4 or 5. Hence the controlling devices 40' and 41 for the clutch and the throttle, and the two devices 42' for operating the brake shoes are all located within easy reach of the operator who walks behind the frame 24 and steers it by means of its cross-piece or handle. The brake shoes may be actuated either simultaneously or alternatively, as desired; in the former instance when the machine is traveling down hill, and in the latter instance when it is to be turned in one direction or the other, in which case the braking action exerted upon one wheel facilitates the turning movement of the other or unbraked wheel, the actuation of the brakes singly also preventing the machine from skidding sidewise or by gravity when traveling along a hillside.

The engine may be started either by means of a flywheel (not shown) or by the operator pushing it forward by hand, and as soon as the engine has commenced to run it will operate the cutting mechanism through the medium of the reciprocating bar 10 and connecting rod. The clutch 21 will then be thrown in by actuating its controlling lever 40' so as to couple the gear 20 to the cross-shaft 16 and thereby effect the driving of the wheels 4 and 5 by means of the intermeshing gears 17 and 18. The reaction set up by the throwing-in of the clutch has a tendency to raise the cutting mechanism from the ground, and this is overcome by adjusting the weight 26 to a position such that said mechanism will be pressed with the required force toward the ground. A pair of mold boards *p—p* may be disposed at opposite sides of the case 11 to move the crop out of the way as the machine proceeds.

Figs. 3 and 4 show a slightly modified arrangement according to which the engine cylinder and the rod 12 which connects the piston to the crank shaft are disposed at the opposite side of the latter from the reciprocating bar 10 and its connecting rod 9, so as to enable the two devices to balance each other. The carbureter of the engine is indicated at 50 in said figures, and the ignition system at 51; and at 54 is indicated a radiator which is ventilated by the passage of the exhaust gases through the perforations with which it is formed. The crank shaft is equipped with two crank portions 8 and 8', disposed at 180° apart and to which the rods 12 and 9 are respectively connected, but in all other respects the construction is substantially the same as that described in connection with Figs. 1 and 2. Many of the parts illustrated in the latter figures are omitted from Figs. 3 and 4, however, to avoid obscurity.

The tubular case 11 carries at its front end a cross-head 31, on which the various elements comprised in the cutting mechanism, now to be described, are mounted. Referring to Figs. 1 and 2, said mechanism consists primarily of fixed and movable cutter parts, the former of which embodies a bar 32 connected to the cross-head 31 by means of angle irons 33 and carries a set of fingers *a* (Fig. 5), at each end of which is arranged a shoe *b*.

The movable part of the cutting mechanism may comprise, as represented in Fig. 5, a suitable knife-carrying bar which is reciprocated endwise over the fixed bar 32 by means of a bell crank lever 34, the latter being fulcrumed at its apex on a pin 38 carried by the cross-head and having one arm connected with the adjacent end of the bar 10 and the other arm connected by a link 35 with a pin or stud 36 on the knife bar. This construction, however, is open to the possible objection that it lacks balance, and hence must be supplemented by a counter-weight which may be arranged either at *c* or at *c'*. To overcome this defect, it has been found advisable to construct the movable cutter part in two sections or halves, as indicated at *d* and *e* (Figs. 6 and 7), and to move said sections alternately toward and from each other, utilizing a double bell crank and link system for that purpose. This arrangement is illustrated more clearly in Figs. 2 and 4, in which the two members or sections of the movable cutter or knife bar are indicated at 37, each section being provided with a projecting pin or stud 36 to which one end of a link 35 is pivoted, the other end of the link being pivoted to the front arm of the adjacent bell crank 34. The inner or rear arms of the two bell cranks terminate in spherical projections which fit in correspondingly-shaped sockets provided in the head 39 of the reciprocating bar 10, though these ball-and-socket connections may, if desired, be replaced by superposed connecting rods 39', as represented in Fig. 4.

Where a two-part knife bar construction, such as the one just described, is utilized, it frequently happens that the central portion of the cutting mechanism will be incapable of exerting a cutting action, so that the portion of the crop immediately in front thereof and indicated at X in Figs. 6 and 7 will be left standing. The developed or modified construction illustrated in Figs. 8, 8ª, 9, 10, 11 and 12 has been designed to rectify this difficulty, and according to which a supplemental cutting section $g$ is employed, said section being attached to the under face of a suitably curved strap or lug $h$ which, in turn, is fastened to the inner end of one of the main sections, in this instance the left-hand section $d$, the free end $h'$ of the strap pressing upon the upper face of the right-hand section $e$. The cutting edges of the supplemental section are beveled in an upward instead of a downward direction (Fig. 8ª), so that they co-act with the projecting edges $k$ of the upper portion of the finger $a$ toward which said section is moving, whereas the other teeth or knives $j$ co-act with the edges of the lower portion $i$ of the finger (Figs. 8ª, 11 and 12). Thus, assuming that the parts are in the positions shown in Figs. 8 and 9, it will be apparent that the supplemental section $g$, during its movement in the direction of the arrow (Fig. 8), will cut in coöperation with the part $k$ of the finger on its left, whereas during its return movement it will coöperate with the finger on its right, thereby insuring the cutting of the entire crop.

The apparatus may be further modified by utilizing instead of a single movable cutter bar, whether composed of one section or two, two superposed bars (Figs. 13, 14 and 15) which are movable relatively to each other and which coöperate with each other by their movements in opposite directions. In such instance, however, the fingers do not contribute to the cutting action, but merely support and guide the knives and divide the tufts to be cut.

While the motor driven form of the invention is deemed preferable, it is possible to utilize the motor only for the actuation of the movable part or parts of the cutting mechanism, in which case the machine will be pushed by hand by the operator walking behind the frame 24. The weight 26 will then have less importance than before, since it no longer has to compensate for the reaction of the wheels on the frame. Hence it may be arranged in a simple tube or sleeve, and the handles would be equipped only with the engine speed-control device. The wheels, in such case, need only be provided with devices for preventing lateral skidding, as devices for preventing skidding in a longitudinal direction would be necessary only where the wheels are positively driven.

I claim as my invention:—

1. In a mowing machine, the combination of a main frame, a pair of wheels supporting the same; a crank shaft journaled in said frame and having said wheels mounted on its ends; an internal combustion engine mounted on said frame and including a piston connected to rotate said crank shaft; a tubular case connected to said frame at the front thereof; a cross-head connected to the front portion of said case; cutting mechanism mounted on the cross-head; a bar mounted to reciprocate in said case and connected at its front end to operate the cutting mechanism; and a link connection between the rear end of said bar and the crank portions of said shaft.

2. In a mowing machine, the combination of a main frame, a pair of wheels supporting the same; a crank shaft journaled in said frame and having said wheels mounted on its ends; an internal combustion engine mounted on said frame and including a piston connected to rotate said crank shaft; a tubular case connected to said frame at the front thereof; a cross-head connected to the front portion of said case; cutting mechanism mounted on the cross-head; a bar mounted to reciprocate in said case and connected at its front end to operate the cutting mechanism; a link connection between the rear end of said bar and the crank portion of said shaft; a cross shaft disposed in rear of and parallel with the crank shaft; a train of gearing between said crank and cross shafts and said wheels for connecting the latter to be positively driven from the crank shaft; a clutch for alternatively completing and interrupting the gear train; and a sliding weight for pressing the cutting mechanism toward the ground in opposition to the tendency of the gear train to raise said mechanism when the clutch is operated to complete said train.

3. In a mowing machine, the combination of a main frame, a pair of wheels supporting the same; a crank shaft journaled in said frame and having said wheels mounted on its ends; an internal combustion engine mounted on said frame and including a piston connected to rotate said crank shaft; a tubular case connected to said frame at the front thereof; a cross-head connected to the front portion of said case; cutting mechanism mounted on the cross-head; a bar mounted to reciprocate in said case and connected at its front end to operate the cutting mechanism, a link connection between the rear end of said bar and the crank portion of said shaft; gearing operable to couple said wheels to said shaft to be driven therefrom and including a clutch to complete or interrupt the gearing; and a sliding weight for pressing the cutting mechanism against the ground in opposition to the tendency of the gearing to raise said mechanism when the clutch is operated to complete said gearing.

4. In a mowing machine, the combination of a main frame, a pair of wheels supporting the same; a crank shaft journaled in said frame and having said wheels mounted on its ends; an internal combustion engine mounted on said frame and including a piston connected to rotate said crank shaft; a tubular case connected to said frame at the front thereof; a cross-head connected to the front portion of said case; cutting mechanism mounted on the cross-head; a bar mounted to reciprocate in said case and connected at its front end to operate the cutting mechanism; a rearwardly extending auxiliary frame for steering the machine; and a counterweight slidably related to said steering frame.

5. In a mowing machine, the combination of a main frame, a pair of wheels supporting the same; a crank shaft journaled in said frame and having said wheels mounted on its ends; an internal combustion engine mounted on said frame and including a piston connected to rotate said crank shaft; a tubular case connected to said frame at the front thereof; a cross-head connected to the front portion of said case; cutting mechanism mounted on the cross-head; a bar mounted to reciprocate in said case and connected at its front end to operate the cutting mechanism; a link connection between the rear end of said bar and the crank portion of said shaft; gearing operable to couple said wheels to said shaft to be driven therefrom and including a clutch to complete or interrupt the gearing; a rearwardly-extending auxiliary frame for steering the machine; and a counterweight slidably related to said steering frame for pressing the cutting mechanism against the ground in opposition to the tendency of the gearing to raise said mechanism when the clutch is operated to complete said gearing.

6. In a mowing machine, the combination of a main frame, a pair of wheels supporting the same; a crank shaft journaled in said frame and having said wheels mounted on its ends; an internal combustion engine mounted on said frame and including a piston connected to rotate said crank shaft; a tubular case connected to said frame at the front thereof; a cross-head connected to the front portion of said case; cutting mechanism mounted on the cross-head; a bar mounted to reciprocate in said case and connected at its front end to operate the cutting mechanism; a rearwardly-extending auxiliary frame for steering the machine; a counterweight slidably related to the steering frame; and devices carried by said steering frame adjacent its rear end for adjusting the position of said weight and for controlling the speed of the engine.

7. In a mowing machine, the combination of a main frame, a pair of wheels supporting the same; a crank shaft journaled in said frame and having said wheels mounted on its ends; an internal combustion engine mounted on said frame and including a piston connected to rotate said crank shaft; a tubular case connected to said frame at the front thereof; a cross-head connected to the front portion of said case; cutting mechanism mounted on the cross-head; a bar mounted to reciprocate in said case and connected at its front end to operate the cutting mechanism, a link connection between the rear end of said bar and the crank portion of said shaft; gearing operable to couple said wheels to said shaft to be driven therefrom and including a clutch to complete or interrupt the gearing; a rearwardly-extending auxiliary frame for steering the machine; a counterweight slidably related to the steering frame; and devices carried by said steering frame adjacent its rear end for controlling the operation of the clutch and the speed of the engine and for adjusting the position of said weight.

In testimony whereof I have signed this specification in the presence of two subscribing witnesses.

PAUL ANDRÉ.

Witnesses:
GEORGES LOISEL,
JOHN F. SIMONS.